COIN COLLECTORS FOR TELECOMMUNICATION SERVICES

Filed June 23, 1958 4 Sheets-Sheet 1

FREDERICK WILLIAM HALL
ANDREW YOUNG
INVENTORS

BY Robertson and Vontie
ATTORNEY

COIN COLLECTORS FOR TELECOMMUNICATION SERVICES

Filed June 23, 1958

FREDERICK WILLIAM HALL
ANDREW YOUNG
INVENTORS

BY Robertson and Youtie
ATTORNEY

FREDERICK WILLIAM HALL
ANDREW YOUNG
INVENTORS
BY Robertson and Yountie
ATTORNEY

COIN COLLECTORS FOR TELECOMMUNICATION SERVICES

Filed June 23, 1958 4 Sheets-Sheet 4

Frederick William Hall
Andrew Young
INVENTORS

BY Robertson and Vautie
ATTORNEYS 3,023,275

COIN COLLECTORS FOR TELECOMMUNICATION SERVICES

Frederick William Hall and Andrew Young, Willesden, London, England, assignors to Associated Automation Limited, London, England, a British company Filed June 23, 1958, Ser. No. 743,858
9 Claims. (Cl. 179—6.5)

This invention relates to coin collectors for telecommunication services and more especially to a coin collector of the "post-payment" type, that is, for use in a procedure in which payment for a telecommunication service, such as a telephone call, is made by the caller after connection has been established with the called party. This procedure is to be distinguished from the usual "pre-payment" procedure where payment must be made before connection can be established. In co-pending application Serial No. 666,606 now Patent No. 2,998,490 there is disclosed such a coin collector and the present invention relates to a coin collector mechanism which is an improvement of the mechanism disclosed in that co-pending application.

In a post-payment procedure the called party's number is obtained before coins are inserted and the act of answering by the called party may be used to cause "locking mechanism" to unlock the coin slots to permit a coin to be inserted; for instance, the act of answering could be arranged to reverse the polarity of the lines to the caller and condition the locking mechanism to allow coin insertion.

Thus in a post-payment procedure a possible sequence of events would be as follows:

(1) The caller lifts his receiver, giving him a line to the exchange. When the exchange has apparatus available (usually immediately) a tone signal, such as the familiar dialling tone, is sent back to the caller's instrument.

(2) The caller then dials the required number.

(3) The called party, by the act of answering the call, causes a change of state in the lines (as for example the polarity reversal mentioned) from the exchange to the caller's instrument. This change of state may be used to permit unlocking of the coin slots, such as by the release of slot locking mechanism.

(4) The caller then makes the appropriate payment. Until the coin slots have been unlocked it is impossible for a caller to insert a coin or coins.

(5) Immediately after insertion of a coin through one of the coin slots the slot locking mechanism operates to prevent insertion of further coins for a short time during which various operations may take place, including coin checking, and the transmission to the exchange of coin-value signals, such as pulses, corresponding to the coin value. The information thus conveyed by the signals according to the coin value, is used by the exchange for regulation of the length of the call. After completion of coin-value signalling, the slots are again ready for insertion of further coins if required.

(6) Payment having been made the call may proceed, the caller and called parties being already in communication.

(7) Near the end of the call period already paid for and with its duration accordingly governed by the exchange apparatus, a warning, such as a special signal, is transmitted to the caller to give him the opportunity of inserting further coins if he wishes to prolong the call. If by the end of the call period no more coins have been inserted, then the call is terminated by the exchange apparatus.

A coin collector according to the invention may include mechanism for ensuring that functions, such as those already mentioned, are carried out. When a coin slot is unlocked and a coin inserted, a cycle of operations is set in motion. Controlled delay mechanism, for example a centrifugal governor-controlled delay mechanism, is put into operation, to provide a delay period to permit the following functions, for example, to be carried out: testing the inserted coin; signal pulsing according to the coin value; and control of associated circuits. Other functions could be provided for. At the end of the delay period the mechanism reverts to the open slot state, so as to permit insertion of a further coin to extend the call in time or distance, or both.

According to this invention, in a coin collector of the type referred to, coin-value signal transmitting means is selectively positioned by insertion of, and corresponding to the value of, the inserted coin.

Also according to the invention a coin collector of the type referred to has a coin-controlled pulsing contact which is selectively positioned in relation to operating cams or other operating means to provide a signal for each value of coin which the collector is designed to accept.

According to a feature of the invention the mechanical drive of the coin collector is so arranged that operation of the coin-value signal transmitting or pulsing means is in front of the governor mechanism in the drive sequence. In other words, the signalling or pulsing means is interposed between the drive source and the governor mechanism.

According to another feature of the invention, the coin collector has slot locking mechanism so that coins may only be inserted at the proper times. This prevents a caller losing money by inserting coins at the wrong time, it being understood that with a post-payment procedure a coin suspense and return arrangement is not necessary.

The invention will now be described in more detail by way of example, with reference to the accompanying drawings, in which.

Figures 1, 2, 3:
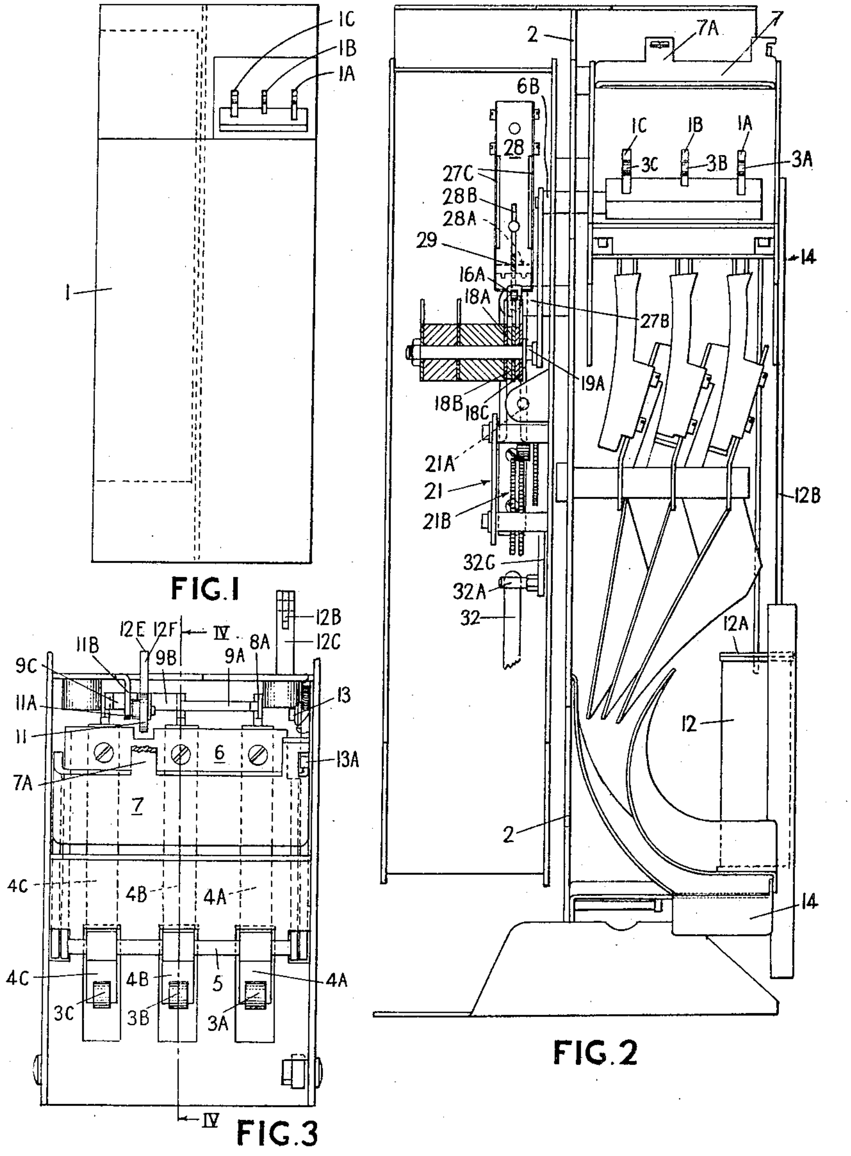
FIGURE 1 is a front elevation of the coin collector casing, showing the coin slots; this figure is drawn to a smaller scale than the remaining figures.
FIGURE 2 is a front elevation with the casing removed.
FIGURE 3 is a top plan, to an enlarged scale, with coin slot plate removed.

Referring to FIGURE 1, the coin collector mechanism is enclosed in a casing 1, having three slots 1A, 1B and 1C, respectively for shillings, sixpences and threepenny pieces. Coins of other denominations and currencies could naturally be provided for. If a shilling is inserted the mechanism is adapted to send to the exchange a number of pulses corresponding to a shilling, for instance 4 pulses, for which mechanism at the exchange then allows a call distance and time appropriate to the value of a shilling. If a sixpence is inserted the mechanism is adapted to send to the exchange a number of pulses corresponding to sixpence, for instance two pulses, and likewise one pulse is sent on the insertion of a threepenny piece.

Referring now to FIGURE 2, it will be seen that the mechanism is centrally divided into two main parts by a central frame member 2. In the right hand part are the three coin slots, three coin levers, the slot locking device, the coin testing device, and the coin chutes to the return slot and to the cash box. In the left hand part are the pulsing contact, the three pulsing sectors or cams, any one of which may operate the pulsing contact, the governor mechanism, the rack and pawl non-return device, and the masking contact.

Motive power for operating the mechanism is imparted by the act of pushing a coin through one of the slots. Thus, referring to FIGURES 2, 3 and 4, if a sixpence is pushed through the centre slot 1B it engages a roller 3B carried by a coin lever 4B which is pivotally mounted on a shaft 5, so that roller 3B is moved along an arcuate path about shaft 5, and the coin lever is angularly raised about the same axis. The coin lever in turn raises a common carriage 6 which is also pivotally mounted on shaft 5. This carriages extends transversely above the three coin levers and raising of any one of the coin levers causes the common carriage to be raised. A transverse yoke 7, also pivotally mounted on the shaft 5, is raised a short angular distance by the common carriage 6 when the latter nears the upper limit of its angular travel. As will be described, the common carriage is linked to the pulsing cams and governor mechanism, and the weight of all these parts, which are lifted when a coin is inserted, constitutes the operating weight of the mechanism. The weight-actuated descent of these movable parts is at a speed controlled by the governor mechanism. A ratchet and pawl arrangement ensures that during the raising of the parts they cannot be lowered until the full ascent has been completed and likewise during the descent they cannot be raised until the full descent has been completed. This ensures that unauthorised manipulations through the slots do not interfere with pulsing or upset the established pulsing routine.

Having described the initial movements caused by the inserted coin, it will now be convenient to describe the slot locking and unlocking.

Figures 4, 5:
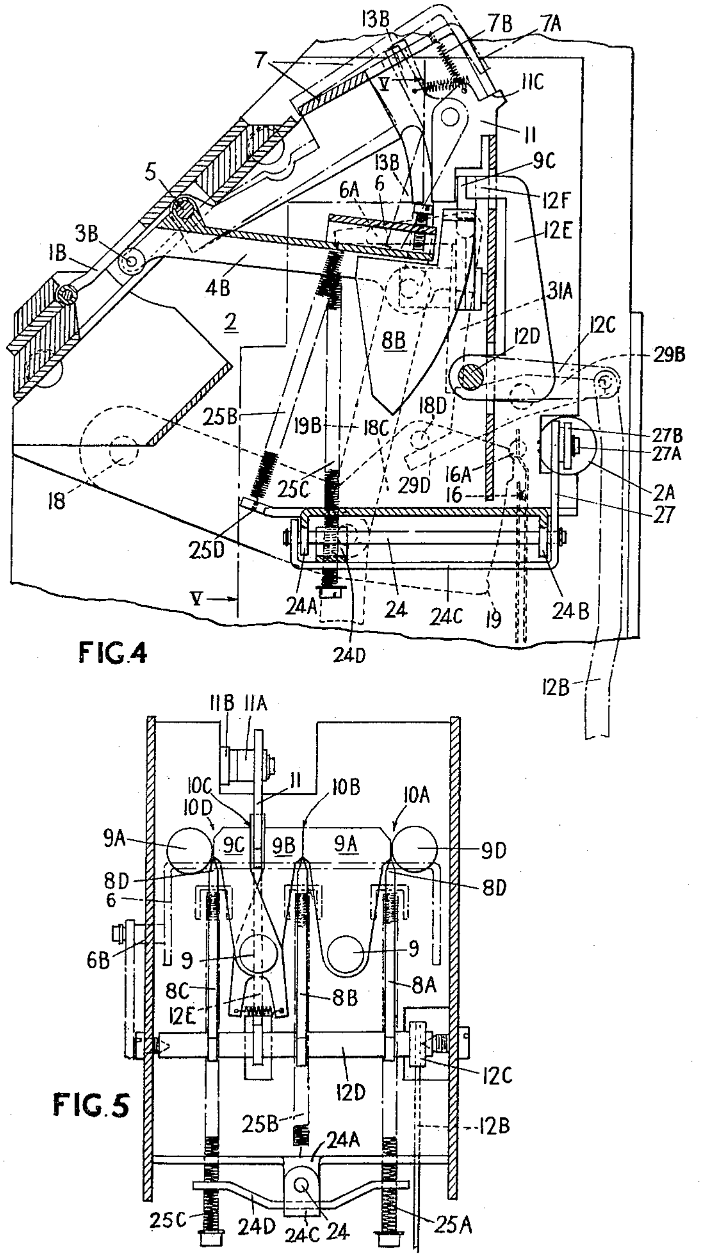
FIGURE 4 is a section on plane IV—IV of FIGURE 3.
FIGURE 5 is a section on plane V—V of FIGURE 4, with parts omitted for clarity.

Referring to FIGURES 4 and 5, each coin lever carries a depending interceptor blade (8A, 8B and 8C) whose upper edge 8D is of wedge shape. Rockably mounted at 9 are interlock sectors 9A, 9B and 9C, which, together with fixed abutments 9D on either side, can provide for a gap to occur in one, and only one, position at a time of four positions 10A, 10B, 10C and 10D. In FIGURE 5 the gap is at position 10C which is where the gap normally occurs, owing to spring biassing of the sectors 9C and 9B. The gap at 10C is filled by a lever 11 rockably mounted at 11A on a bracket 11B. Because the gap is so filled, sectors 9A, 9B and 9C cannot rock and the gap cannot appear anywhere else. Consequently none of the interceptor blades 8A, 8B and 8C can rise up into a gap, nor can the coin levers 4A, 4B and 4C which carry them, rise. Since the coin levers cannot rise, rollers 3A, 3B and 3C cannot move and they block the coin slots, preventing coin insertion. To unlock the coin slots, rollers 3A, 3B and 3C must be able to move, and thus nothing must prevent rocking of sectors 9A, 9B and 9C. Normally the sectors cannot move. Only when the called party answers can they move and the slots be unlocked. This is brought about by an electromagnetically operated lock. Whilst a coin is being inserted through one slot, the other slots are locked, because the appropriate blade 8A, 8B or 8C creates and fills one of the gaps 10A to 10D. After the coin has been inserted, all the slots are locked by another, mechanically operated lock (the lever 11), so that there can be no interference with pulsing. When pulsing is completed, the mechanical lock is removed, and, so long as the called party has not replaced his receiver, a further coin can be inserted to prolong the call.

After the connection between the caller and the called party has been established, a signal reaches the coin collector, such as by a polarity reversal in the lines, which signal operates an electromagnet 12 (see FIGURE 2). The armature 12A of the electromagnet operates a vertical link 12B connected to a crank 12C fixed on a transverse rocking shaft 12D. On shaft 12D is fixed a locking lever 12E whose upper end is formed with a forwardly extending nose 12F for entering and blocking the gap at 10C. On energisation of the electromagnet the armature is pulled in and consequently lever 12E and nose 12F are rocked rearwardly away from the gap 10C.

A coin may then be inserted, to carry out the operations previously described.

After coin insertion, pulsing occurs. During pulsing lever 11 enters the gap at 10C from the front, to lock the coin slots. When pulsing is completed, lever 11 is withdrawn from the gap, either to permit further coin insertion, or to permit nose 12F to reenter the gap at 10C.

Referring to FIGURES 3, 4 and 5, transverse yoke 7 has a downwardly extending finger 7A which normally presses down on lever 11, at 11C, by virtue of a tension coil spring 7B connecting yoke 7 to lever 11 above pivot 11A. This arrangement normally keeps the lower end of lever 11 out of the gap at 10C. When common carriage 6 has been angularly raised by a coin lever nearly to the full extent, it comes into contact with yoke 7 which is also angularly raised a short distance, (see FIGURE 4) thus pulling on lever 11, through spring 7B. This rocks lever 11 so that it enters the gap. It is held in this position by the retention in the raised position of the yoke 7 by means of a bell crank, rockably mounted at 13, whose upper arm 13A is spring biassed in a rearward direction so that it engages below the yoke when the latter is raised. In other words, the yoke is held in its upper position. The lower arm 13B of the bell crank is in the path of a laterally extending pin 6A on common carriage 6. As the carriage approaches the end of its descent, after pulsing is completed, the pin 6A engages lower arm 13B and rocks the bell crank so that the yoke can be pulled down, by spring 7B, to its normal lower position, thus restoring lever 11 to its normal position clear of gap 10C.

Below the coin slits and coin levers is a coin testing device, generally indicated at 14, which is of well known construction. It rejects a bad coin and returns it to a return slot 14A. It allows a good coin to move to the back of the coil collector where the good coin actuates a transverse plate 15 (FIGURES 12 and 13) rearwardly for a moment as the coin passes the plate. The purpose of this rockable plate 15 will be described later. The good coin drops into a coin box (not shown) in the usual manner.

Figure 6:
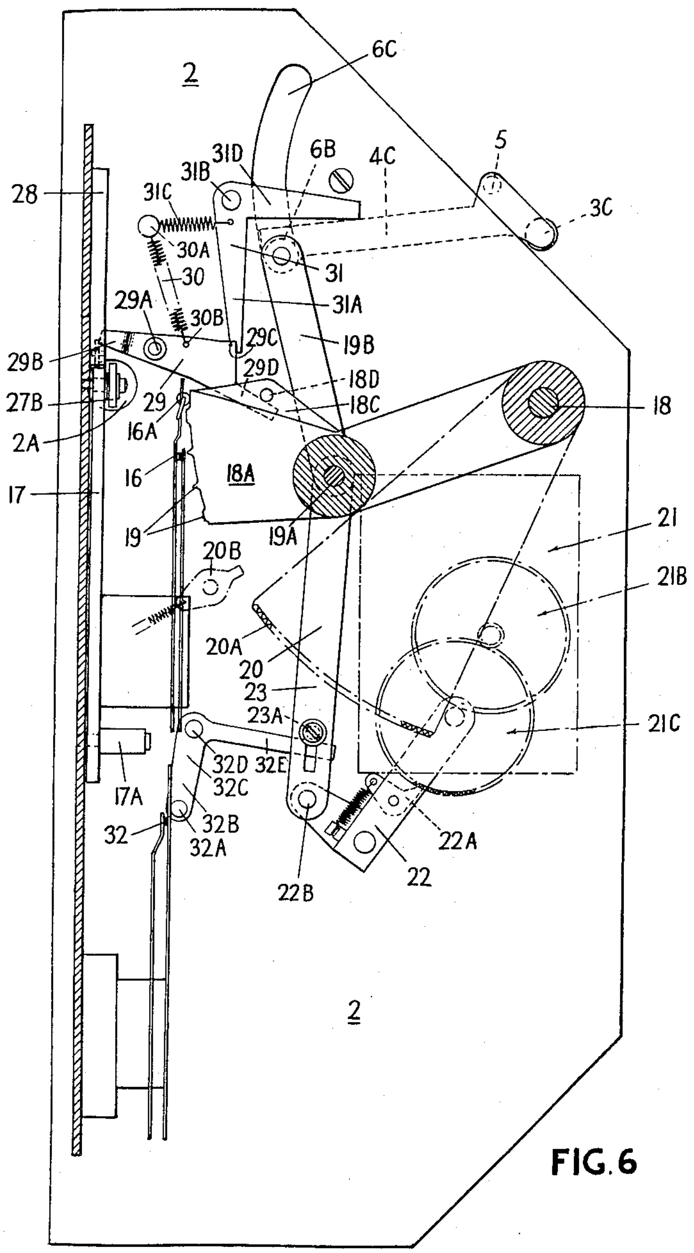
FIGURE 6 is a side elevation, as seen from the left of FIGURE 2, the side plate being removed.
Figure 8:
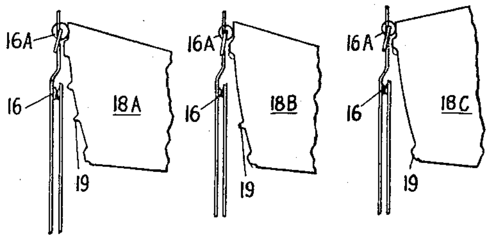
FIGURE 8 shows the three cam profiles.

The pulsing mechanism may be seen in FIGURES 2, 4 and 6. A pulsing contact assembly includes a contact 16 with one of its blades upwardly extended to carry a contact roller 16A. The contact 16 is carried on a swinging carriage arm 17 which is rockably mounted at 17A. In front of arm 17 is a series of three pulsing sectors or cams 18A, 18B and 18C rotatably mounted on a shaft 18. The cam 18A has four pulsing projections or lobes 19, the cam 18B, two lobes 19, and the cam 18C, one lobe 19. The arm 17 allows the contact roller 16A to be selectively positioned opposite any one of the cams 18A, 18B or 18C, according to the value of the coin inserted. Thus insertion of a shilling will cause the roller 16A to be opposite the sector 18A, so that the contact 16 will be opened four times, to send four pulses to the exchange, which will thereby be informed that a shilling has been inserted.

The cams 18A, 18B and 18C move in unison on shaft 18. They are raised by common carriage 6, which has a rod 6B, extending laterally through a curved slot 6C in the central frame member 2, and connected to the top of a link 19B whose lower end is pivotally connected to the cams at 19A.

Also movable in unison with the cams on the shaft 18 is a rack sector 20 whose teeth 20A engage a two-way pawl 20B which will only permit movement of the rack sector, and consequently of the cam sectors and the common carriage, in one direction until that movement is completed. Thus during coin insertion when the parts are rising, the rack and pawl will not permit the parts to descend until rising is completed; similarly when the parts are descending, they cannot be raised until descending is completed.

Governor mechanism 21 includes a centrifugal governor 21A, and a gear train generally indicated at 21B, whose first gear 21C is driven, in one direction only, by an angularly movable arm 22, mounted on the same axis as gear 21C, through the medium of a pawl 22A on arm 22. The other end of arm 22 is pivotally connected at 22B to the lower end of a link 23 whose upper end is pivotally connected at 19A to the cams. Thus when the common carriage and pulsing cams are raised, arm 22 is raised. When the weight of the movable parts causes them to descend, to carry out pulsing, pawl 22A engages gear 21C, governor 21A is driven, and the speed of pulsing is controlled accordingly.

It is stated above that contact roller 16A (with pulsing contact 16 and arm 17) is selectively positioned behind the appropriate cam 18A, 18B or 18C when a coin is inserted. This action will now be described in more detail.

Referring to FIGURES 4 and 5, a rod 24 is mounted in spaced, downwardly extending lugs 24A and 24B. The rod extends at each end beyond the lugs and on it is journalled a rocking bar 24C which carries a laterally extending rocker 24D. Each end of this rocker 24D is connected to a long, tension coil spring, 25A and 25C. The spring 25A is connected to coin lever 4A and the spring 25C to coin lever 4C. These springs serve two purposes: to return the coin levers to normal after either of them has been raised by coin insertion; and to rock the rocker 24D and rocking bar 24C. Thus if a shilling is inserted, coin lever 4A lifts (see FIGURE 5) the right hand end of rocker 24D, through spring 25A. Similarly a threepenny piece causes the left hand end of rocker 24D to be lifted, rocking the bar 24C in the other direction about rod 24. Insertion of a sixpence, which raises centre coin lever 4B, does not affect the rocker and rocking bar, which remain in the central position shown in FIGURE 5. A return tension coil spring 25B is connected to coin lever 4B and to the frame at 25D.

Figure 7:
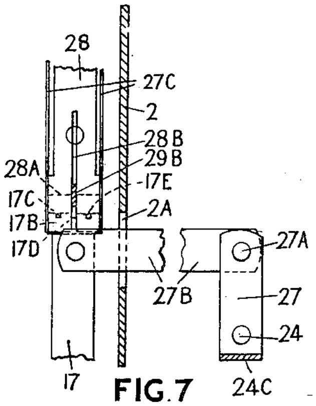
FIGURE 7 is a detail view showing the swinging carriage arm and associated links.

The rocking movement to one side or the other of rocking bar 24C on coin insection is used to select the position of the contact roller 16A and its associated parts. This is achieved as follows:

The rear end of bar 24C is bent up to provide an upward extension 27 to which is pivotally connected at 27A a lateral link 27B (see FIGURE 7). This link 27B, passing through a hole 2A in the central frame member 2, is pivotally connected at its other end to arm 17 which carries pulsing contact 16. As has been mentioned, this arm 17 is rockably mounted at 17A. By virtue of link 27B, which connects rocking bar 24C to arm 17, when a shilling is inserted the right hand end of rocker 24D (FIGURE 5) is raised and link 27B is moved to the left (as seen in FIGURE 7), in turn moving arm 17, so that pulsing roller 16A is opposite the shilling cam 18A. Similarly insertion of a threepenny piece causes movement of arm 17 so as to bring roller 16A opposite the threepenny cam 18C. Since insertion of a sixpence does not move link 27B, arm 17 and roller 16A remain in their normal, central position opposite the sixpenny cam 18B (see also FIGURE 9).

Figures 9, 10, 11:
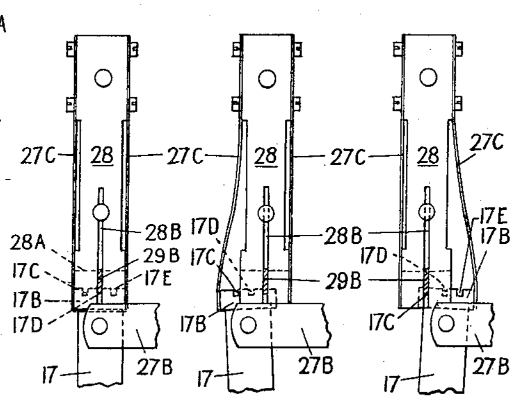
FIGURES 9, 10 and 11 are detail views showing the three positions of the swinging carriage arm.

The arm 17 is held immovable whilst pulsing is in progress by a locking arrangement. Referring to FIGURES 6, 9, 10 and 11, arm 17 has a thin upward extension 17B, the top edge of which has three detents 17C, 17D and 17E. This extension 17B rides in a transverse, vertical slot 28A in a block 28 which extends above arm 17. The block 28 has another vertical slot 28B in a plane at right angles to slot 28A (FIGURES 2, 9, 10 and 11). Arranged one on either side of block 28 are leaf springs 28C which engage the sides of extension 17B for returning arm 17 always to its normal central position (FIGURE 9). A locking lever 29 is pivotally mounted at 29A, so that its rear end 29B may slide in vertical slot, 28B, into or out of engagement with one of the detents 17C, 17D or 17E. When lever 29 is in engagement with one of these detents, arm 17 is fixed in position for operation by the appropriate lobes 19. FIGURE 9 shows the normal central position of arm 17, with locking lever 29 engaging detent 17D, for sixpence pulsing. FIGURES 10 and 11 show the corresponding positions for shilling and threepenny pulsing respectively. The locking lever 29 has a shoulder 29C and a forward extension 29D. A tension coil spring 30 (anchored to the frame at 30A and connected to lever 29 at 30B) tends to move lever 29 into detent-engaging position. This movement is blocked by the lower end 31A of a bell crank 31, pivotally mounted at 31B and urged by a tension coil spring 31C into engagement with the shoulder 29B, as shown in FIGURE 6. The spring 31C is anchored at 30A.

The upper arm 31D of bell crank 31 is in the path of a laterally extending pin 18D on the threepenny cam 18C. When the cams are raised almost to their upper limit of movement and just before their descent for pulsing, pin 18D abuts and moves bell crank arm 31D, causing the lower end 31A to move forward and free locking lever 29, which, under action of spring 30, enters the appropriate detent to lock arm 17 and pulsing roller 16A. As pin 18D nears the end of its downward movement, after pulsing is completed, it abuts and depresses forward extension 29C of locking lever 29, thus lifting the latter up from detent engagement and permitting arm 17 and all associated parts to move again if another shilling or threepenny piece is inserted.

The coin collector is electrically masked from the lines, except during pulsing following insertion of a good coin. Pulsing can be initiated by a bad coin, but, since the coin collector in that event remains masked, the pulsing will be ineffective.

This is achieved as follows. A masking contact 32 (FIGURE 6) is normally held closed (to short the collector) by an arm 32A on the lower element 32B of a bell crank 32C pivotally mounted on a shaft 32D and having its upper element 32E in the path of a laterally extending pin 32A on the governor-setting link 23. In the normal, lowermost position of link 23 pin 23A causes arm 32A to press against the masking contact.

Figure 12:
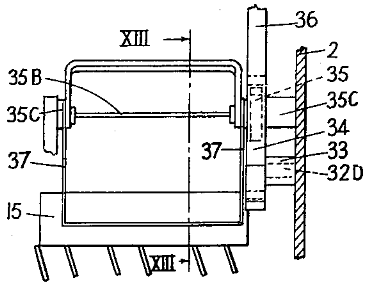
FIGURE 12 is a rear elevation of a detail.
Figure 13:
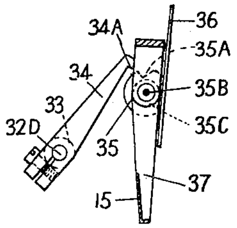
FIGURE 13 is a section on plane XIII—XIII of FIGURE 12.

Referring now to FIGURE 13, the other end of shaft 32D (which is journalled in a bearing 33 in the frame) carries a catch arm 34 having a nose 34A. This is normally held just clear of the periphery of a small cam 35, and just in front of a detent 35A. The cam 35 is fixed on a shaft 35D journalled at each end in bearings 35C and the frame (FIGURE 12). The cam 35 is acted on by a leaf spring 36, fixed to the frame, to bias cam 35 normally to a position such that nose 34A is just clear of the cam periphery forward of detent 35A. When pin 23A rises clear of bell crank element 32E, the masking contact pushes arm 32A forward, thus turning shaft 32D and catch arm 34 so that nose 34A comes into contact with the periphery of the small cam 35, just ahead of the detent 35A therein.

Also rockably mounted on shaft 35B (FIGURE 12) are two depending spaced arms 37, between the lower ends of which is fixed the rockable plate 15. A good coin, when falling from the coin testing device 14 to the con box (not shown), touches plate 15 momentarily and displaces it rearwardly. This displacement turns shaft 35B and cam 35, to position detent 35A so that nose 34A can drop into it and hold the cam and shaft out of their normal positions and against the action of leaf spring 36. In addition, with nose 34A in detent 35A, catch arm 34 will have turned shaft 32D, which will have moved lower bell crank element 32B and arm 32A forward, so that masking contact 32 is able to open and remove the short across the coin collector. When link 23 and pin 23A, after pulsing and during the final part of their descent, depress upper bell crank element 32E, the masking contact is again closed, shaft 32D turned, nose 34A lifted from cam detent 35A, to allow leaf spring 36 to return cam 35, arms 37 and rockable plate 15 to their normal positions in readiness for operation by the next good coin as it passes from the coin testing device to the coin box.

What we claim is:

1. A coin collector for telecommunication services comprising a plurality of coin slots, coin actuated means associated with each of said slots, and pulse transmitting means, said pulse transmitting means comprising a pulse transmitting contact, a plurality of contact operating members corresponding respectively to said coin-actuated means, contact-moving means for causing movement of said contact relative to said members for operation of said contact by a selected member, said contact moving means being operatively associated with said coin actuated means, a mechanical drive for said pulse transmitting means, and a governor mechanism for controlling the speed of operation of said drive, said pulse transmitting means preceding said governor mechanism in the drive sequence.

2. A coin collector for telecommunication services comprising a plurality of coin slots, coin actuated means associated with each of said slots, and pulse transmitting means, said pulse transmitting means comprising a pulse transmitting contact, a plurality of contact operating members corresponding in number to said coin-actuated means, means for moving said contact for operation by one of said operating members, connecting means between said coin actuated means and said contact moving means to move said contact for operation by the operating member corresponding to a respective coin-actuated means, a mechanical drive for said pulse transmitting means, and a governor mechanism for controlling the speed of operation of said drive, said pulse transmitting means preceding said governor mechanism in the drive sequence.

3. A coin collector for telecommunication services comprising coin slots, coin actuated means, and pulse transmitting means, said pulse transmitting means comprising a contact, an arm carrying said contact, said arm being arcuately rockable, a plurality of contact operating cams, contact operating lobes on each said cam, each said cam having different quantity of said lobes, means for selectively positioning said arm for operation by one of said cams, a first connecting means between said coin actuated means and said positioning means, a second connecting means between said positioning means and said arm, a mechanical drive for said pulse transmitting means, and a governor mechanism for controlling the speed of operation of said drive, said pulse transmitting means preceding said governor mechanism in the drive sequence.

4. A coin collector for telecommunication services comprising coin slots, coin-actuated means, and pulse-transmitting means, said pulse-transmitting means comprising a pulse-transmitting contact, a plurality of contact-operating members, means for causing relative movement of said contact and said members, said means for causing relative movement being operatively associated with said coin-actuated means, a mechanical drive for said pulse transmitting means, a weight for actuating said drive, and a connection between said coin actuated means and said weight for raising said weight when a coin is inserted.

5. A coin collector for telecommunication services comprising coin slots, coin-actuated means, and pulse-transmitting means, said pulse-transmitting means comprising a contact, an arm carrying said contact, said arm being arcuately rockable, a plurality of contact-operating cams, contact-operating lobes on each said cam, each said cam having different quantity of said lobes, means for selectively positioning said arm for operation by one of said cams, a first connecting means between said coin-actuated means and said positioning means, a second connecting means between said positioning means and said arm, and three contact operating cams, one said cam having one of said lobes, another said cam having two said lobes and the third said cam having three said lobes.

6. A coin collector according to claim 5 in which said positioning means comprises rockable interlock sectors and fixed abutments which are so spaced in relation to one another that a gap may be made in any one of four positions, such that whilst the gap is in one position a gap cannot be made in any other position.

7. A coin collector according to claim 6 and comprising an electromagnetically operated locking lever, three interceptor blades, and three coin levers, each interceptor blade being carried and movable by a coin lever, characterised in that either of the locking levers may enter the gap when in one of the four positions, or each of the blades may enter the gap when in one of the three other positions, which correspond to the three blades.

8. A coin collector according to claim 7 characterised in that spring means operative on the rockable sectors cause the gap normally to appear in the position in which it may be entered by one of the locking levers, so that when the gap in that position is occupied by a locking lever, the interceptor blades and the coin levers cannot be moved, whereby the slots are locked to prevent coin insertion.

9. A coin collector according to claim 7 characterised in that the mechanical locking lever enters the gap directly after coin insertion.

References Cited in the file of this patent

UNITED STATES PATENTS

| | | |
|---|---|---|
| 2,362,244 | Chojnowski | Nov. 7, 1944 |
| 2,769,023 | Loew et al. | Oct. 30, 1956 |
| 2,817,709 | Alexandersson | Dec. 24, 1957 |
| 2,856,460 | Faulkner et al. | Oct. 14, 1958 |
| 2,883,463 | Goodale et al. | Apr. 21, 1959 |